(No Model.)
H. LONGAUER.
FAN.
No. 550,107. Patented Nov. 19, 1895.
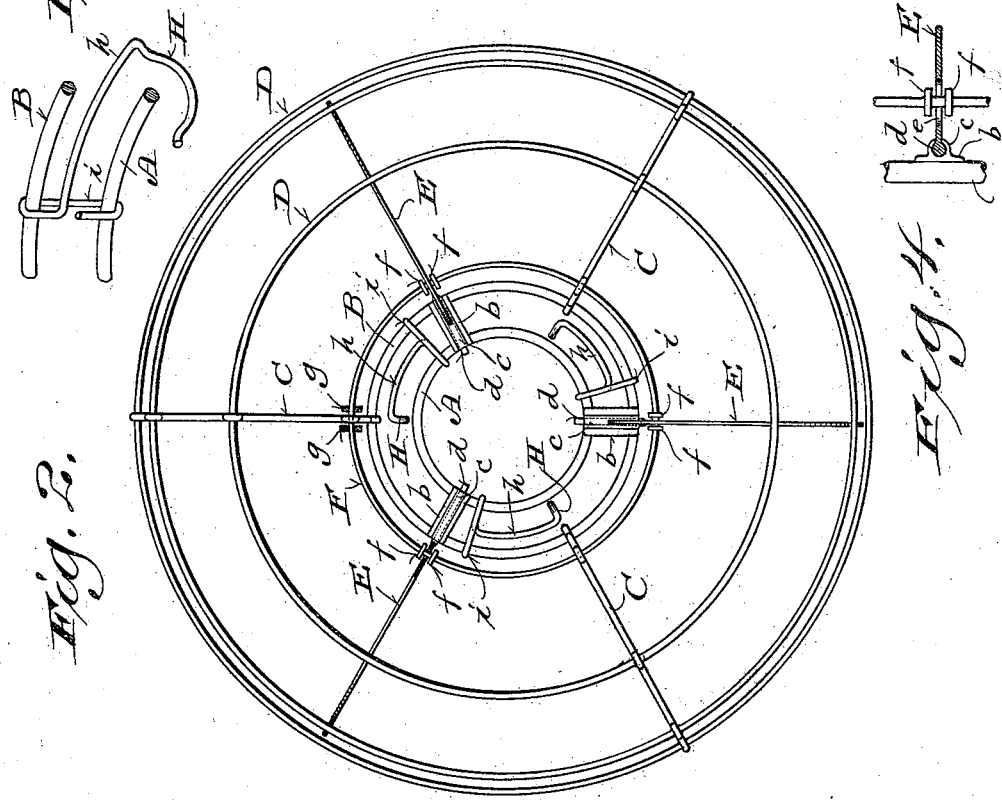
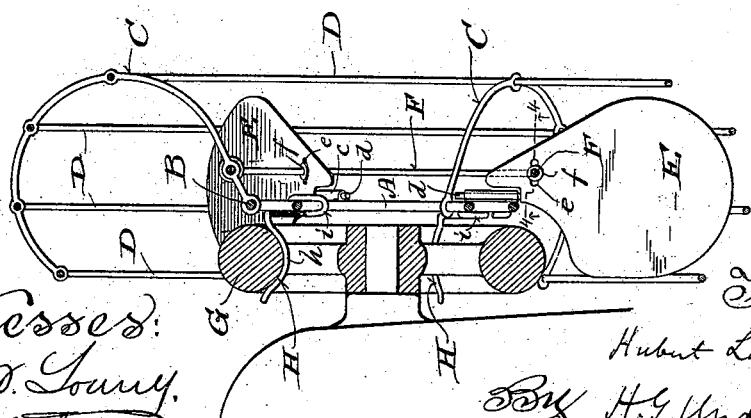
Witnesses:
Geo. W. Lowry.
N. E. Oliphant
Inventor:
Hubert Longauer
By H. G. Underwood
Attorneys

United States Patent Office.

HUBERT LONGAUER, OF MILWAUKEE, WISCONSIN, ASSIGNOR OF TWO-THIRDS TO HENRY ZERVAS AND JULIUS WEGERT, OF SAME PLACE.

FAN.

SPECIFICATION forming part of Letters Patent No. 550,107, dated November 19, 1895.

Application filed May 6, 1895. Serial No. 548,288. (No model.)

*To all whom it may concern:*

Be it known that I, HUBERT LONGAUER, a citizen of the United States, and a resident of Milwaukee, in the county of Milwaukee and State of Wisconsin, have invented certain new and useful Improvements in Fans; and I do hereby declare that the following is a full, clear, and exact description thereof.

My invention has for its object to provide simple, economical, and effective fans readily attachable to rotary parts of various machines, it being especially designed for use in connection with hand-wheels of sewing-machines; and it consists in certain peculiarities of construction and combination of parts hereinafter set forth with reference to the accompanying drawings, and subsequently claimed.

In the drawings, Figure 1 represents a sectional view of my fan in connection with a sewing-machine; Fig. 2, an elevation of the same; Fig. 3, a detail perspective view illustrating a spring-clamping device constituting part of the fan, and Fig. 4 a detail sectional view taken on line 4 4 of Fig. 1.

Referring by letter to the drawings, I show a wire cage comprising concentric rings A B, joined at intervals by plates $b$, suitably curved braces C, connected at their inner ends to the ring B, and a series of rings D fast in the braces, the general contour of said cage being clearly illustrated in Fig. 1 and constituting a guard for blades E, hereinafter set forth.

The plates $b$, connecting the rings A B, are provided with bearings $c$ for stems $d$, soldered or otherwise rigidly joined to the blades E, and slots $e$ in these blades are engaged by a ring F, loose in the braces C above specified.

Collars $f$, fast on the ring F, face opposite sides of the blades to exert pressure thereon when said ring is shifted, and the slots in said blades permit the latter to change their angles when the shift takes place in either direction.

Loose on the ring F are disks $g$, of rubber or other suitable material, that face opposite sides of one of the braces C, the frictional resistance of either disk when properly adjusted being sufficient to prevent automatic shift of said ring and consequent disarrangement of the blades E above specified.

Any suitable means may be employed for the attachment of the blade-containing cage to the hand-wheel G of a sewing-machine (shown in Fig. 1) or to a rotary part of various other machines; but as a matter of preference I show spring-wire clamping-hooks H, having shanks $h$, terminating in loops $i$, engaging the wires A B of said cage. By the employment of the spring clamping-hooks herein shown the blade-containing cage may be readily attached to the hand-wheel of any sewing-machine, said hooks coming tight against the inner portion of the rim of such a wheel. It is also to be observed that the fan-blades may be adjusted at will to deflect air toward or from the operator of the machine in greater or less degree, proportionate to the angle of adjustment, or said blades may be set so as to not deflect in either direction aforesaid.

Having thus described my invention, what I claim as new, and desire to secure by Letters Patent, is—

1. A fan comprising a skeleton cage consisting of a pair of concentric rings joined at intervals by suitable plates, curved braces connected to the outermost of said rings and other rings supported in the braces; slotted blades within the cage having stems loose in bearings on the aforesaid plates, another ring loose in said braces and the blade-slots, collars on the latter ring facing opposite sides of each blade, and stops adjustable on said latter ring on opposite sides of one of the aforesaid braces.

2. A fan comprising a skeleton cage consisting of a pair of concentric rings joined at intervals by suitable plates, curved braces connected to the outermost of said rings, and other rings supported in the braces, slotted blades within the cage having stems loose in bearings on the aforesaid plates, another ring loose in said braces and blade-slots, and collars on the latter ring facing opposite sides of each blade.

In testimony that I claim the foregoing I have hereunto set my hand, at Milwaukee, in the county of Milwaukee and State of Wisconsin, in the presence of two witnesses.

HUBERT LONGAUER.

Witnesses:
GEO. W. LOWREY,
N. E. OLIPHANT.